UNITED STATES PATENT OFFICE.

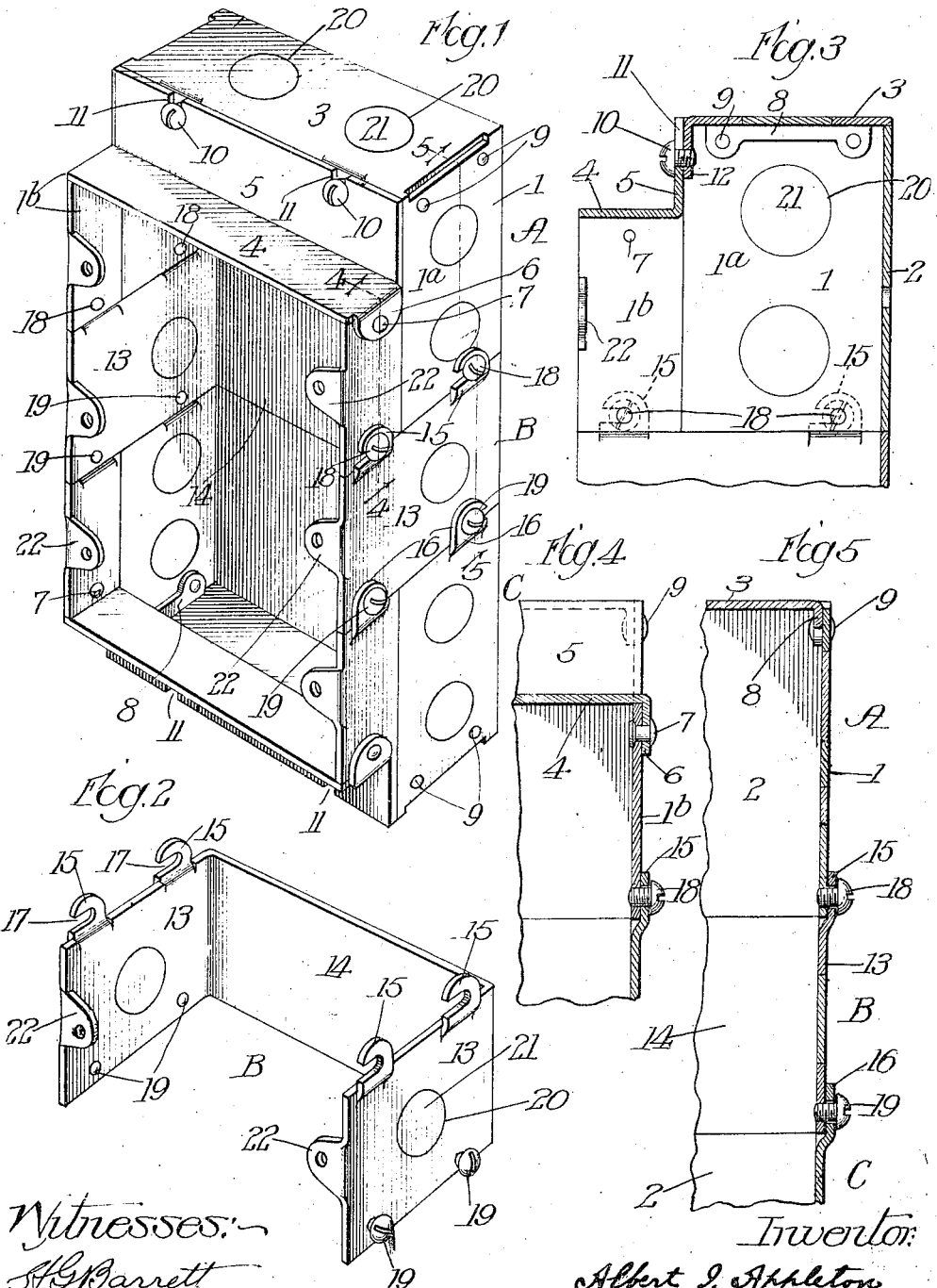

ALBERT I. APPLETON, OF CHICAGO, ILLINOIS, ASSIGNOR TO CHICAGO FUSE MANUFACTURING COMPANY, OF CHICAGO, ILLINOIS, A CORPORATION OF ILLINOIS.

OUTLET-BOX.

1,016,925.　　　　Specification of Letters Patent.　　　Patented Feb. 13, 1912.

Application filed August 21, 1909. Serial No. 513,859.

*To all whom it may concern:*

Be it known that I, ALBERT I. APPLETON, a citizen of the United States, residing at Chicago, in the county of Cook and State of Illinois, have invented certain new and useful Improvements in Outlet-Boxes, of which the following is a specification.

This invention relates to receptacles commonly employed in electric wiring systems for containing switches, fuses, and other electrical apparatus.

The embodiment herein shown of the invention is of the type of box adapted to be placed in the walls of buildings to receive the ends of conduits carrying electric wires, the wires in the conduits being connected to switches or the like mounted in the box.

In order that outlet boxes of the required size may be conveniently obtained, such boxes have heretofore been made in sections; the workman assembling a suitable number of sections to form a box of the desired size.

The object of this invention is to provide improved means for connecting together the sections of a sectional outlet box or similar electrical container.

In the accompanying drawings, Figure 1 is a perspective view of an outlet box embodying the features of my invention. Fig. 2 is a perspective view of a box section. Fig. 3 is a fragmental sectional view through the box. Figs. 4 and 5 are sections on lines 4 4 and 5 5, respectively, of Fig. 1.

The embodiment selected for illustration comprises two end sections A and C and an intermediate or spacer section B, the spacer section being illustrated in detail in Fig. 2. As herein shown, each end section A C consists of two opposite side walls 1, a rear wall 2, partial end walls 3 and 4, and a partial top wall 5. The side walls 1 may be integral with the rear wall 2. I have herein shown each of the side walls 1 as comprising two sections 1ª and 1ᵇ, although it will be understood that said wall may consist of an integral piece of sheet metal. The partial top wall 5 and the partial end wall 4 may be integral, the partial side walls 1ᵇ being connected to the wall 4 by any suitable means, as, for example, angular ears 6 on the walls 1ᵇ and rivets 7 extending through said ears and partial side walls. The partial end wall 3 may be attached to the remainder of the box section by means of angular lugs 8 on said partial end wall and rivets 9. In the form herein shown the partial top wall 5 is secured to the partial end wall 3 by means of screws 10 extending through slots 11 in said partial top wall into threaded ears 12 upon the partial end wall 3.

Each spacer section B may consist of side walls 13 and a rear wall 14, said walls preferably being integral.

The means for connecting box sections A B C together in suitable numbers to form a box of the required dimensions comprises one or more lugs 15 formed, in this instance, upon one edge of each side wall of each spacer section B and lugs 16 on one edge of each side wall of the end section C. Said lugs lie in planes extending substantially parallel with the planes of the side walls of the sections A, B and C, and are arranged to lie at the outer faces of the side walls of the sections A B. The lugs 15 and 16 have open-end slots 17 (Fig. 2) therein to receive screws 18 seated in the side walls of the end section A and screws 19 in the side walls of the spacer sections B. It will be seen that a spacer section B may be secured to an end section A by slipping the slotted lugs 15 under the heads of the screws 18 and tightening up said screws to clamp the lugs 15 to the side walls 1 of said end section A. Similarly, additional spacer sections B may be secured to a spacer section by slipping the lugs 15 thereon under the heads of the screws 19 on such spacer section, and tightening up the screws 19. In like manner, an end section C may be attached to a spacer section B by placing the lugs 16 upon the screws 19 and driving said screws home. Where a two-section box is desired, an end section C may be secured to an end section A by passing the lugs 16 under the heads of the screws 18 and tightening said screws.

It will be apparent that the section-connecting means herein shown obviates the necessity for wholly removing the screws from the box section, with the attendant liability of dropping the screws and the necessity for starting them in their openings when replaced. To separate two sections, it is merely necessary to loosen the screws sufficiently to permit the open-end lugs to be slipped out from beneath the heads of the screws.

As hereinbefore described, box sections may be secured together in the desired combination by placing the slotted lugs beneath the heads of the screws, and tightening up said screws.

The box may be attached to its supports in the wall or other structure in any suitable manner.

One or more conduits may be connected to the box in any preferred way, as by providing openings 20 in the box walls to receive the ends of conduits, said openings being closed by plugs 21 until needed.

Switches or the like may be mounted in the box in any common or suitable way, as by means of the perforated, screw-threaded ears 22.

I would have it understood that the invention is not limited to the precise details shown and described, for various modifications will occur to persons skilled in the art.

I claim as my invention:

1. An electric outlet box comprising two sections, and means for securing adjacent side walls of said sections together comprising a screw in one side wall and a slotted lug rigidly fixed on the adjacent side wall and extending in a plane substantially parallel with said walls and adapted to be slipped beneath the head of said screw.

2. An electric outlet box comprising two sections, and means for securing adjacent walls of said sections together comprising a projecting part on one wall and a slotted lug rigidly fixed on the adjacent wall and adapted to engage said projecting part.

3. An electric outlet box comprising two sections, and means for securing said sections together comprising screws in opposite side walls of one section and slotted lugs rigidly fixed on the other section and extending in planes substantially parallel with said side walls and adapted to be slipped beneath the heads of said screws.

4. An electric outlet box comprising two sections, and means for connecting said sections together comprising portions projecting from opposite side walls of one section, and lugs rigidly fixed upon the other section and extending in planes substantially parallel with said side walls and having open-end slots adapted to receive said projecting portions.

ALBERT I. APPLETON.

Witnesses:
J. RAYMOND BARSE,
GEORGE L. CHINDAHL.